United States Patent [19]

Hiraiwa et al.

[11] Patent Number: 4,495,832

[45] Date of Patent: Jan. 29, 1985

[54] GEAR OPERATING MECHANISM OF AN AUTOMOTIVE MANUAL TRANSMISSION

[75] Inventors: Kazuyoshi Hiraiwa; Akio Kawaguchi, both of Yokohama, Japan

[73] Assignee: Nissan Motor Company, Limited, Japan

[21] Appl. No.: 379,508

[22] Filed: May 18, 1982

[30] Foreign Application Priority Data

May 19, 1981 [JP] Japan ................................. 56-74100

[51] Int. Cl.³ ........................ B60K 20/00; G05G 5/10
[52] U.S. Cl. .................................. 74/475; 74/473 R; 74/477
[58] Field of Search ................... 74/473 R, 475, 477

[56] References Cited

U.S. PATENT DOCUMENTS

| | | | |
|---|---|---|---|
| 2,434,051 | 1/1948 | Randol | 74/477 |
| 3,264,893 | 8/1966 | Stott et al. | 74/477 |
| 3,319,479 | 5/1967 | Tavelli et al. | 74/333 |
| 3,731,554 | 5/1973 | Renk | 74/477 |
| 3,902,378 | 9/1975 | Osborn | 74/477 |
| 4,022,079 | 5/1977 | Hidaka | 74/476 |
| 4,158,969 | 6/1979 | Tuksa | 74/477 |
| 4,193,316 | 3/1980 | Kelbel | 74/477 |
| 4,222,281 | 9/1980 | Mylenek | 74/477 |
| 4,337,675 | 7/1982 | Holdeman | 74/477 |

FOREIGN PATENT DOCUMENTS 2299562 1/1975 France .

Primary Examiner—Allan D. Herrmann
Assistant Examiner—Michael J. Gonet
Attorney, Agent, or Firm—Lowe, King, Price & Becker

[57] ABSTRACT

In a manual transmission having a gear which is movable within a range from its inoperative position to its operating position, there is provided a gear operating mechanism which is constructed to positively prevent the undesirable "gear disengagement". The mechanism comprises a bracket secured to a transmission case, an operating lever pivotally connected to the bracket to move the gear between the inoperative and operating positions, and a latch mechanism having first and second conditions, the first condition being a condition wherein the operating lever is locked in a position to cause the gear to assume the operating position and the second condition being a condition wherein the operating lever assumes another position to cause the gear to assume the inoperative position, wherein the latch mechanism is so arranged that when, with the gear assuming the operating position, a force is applied to the gear to urge the same in a direction from the operating position to the inoperative position, at least a part of the force is received by the transmission case through the latch mechanism.

11 Claims, 4 Drawing Figures

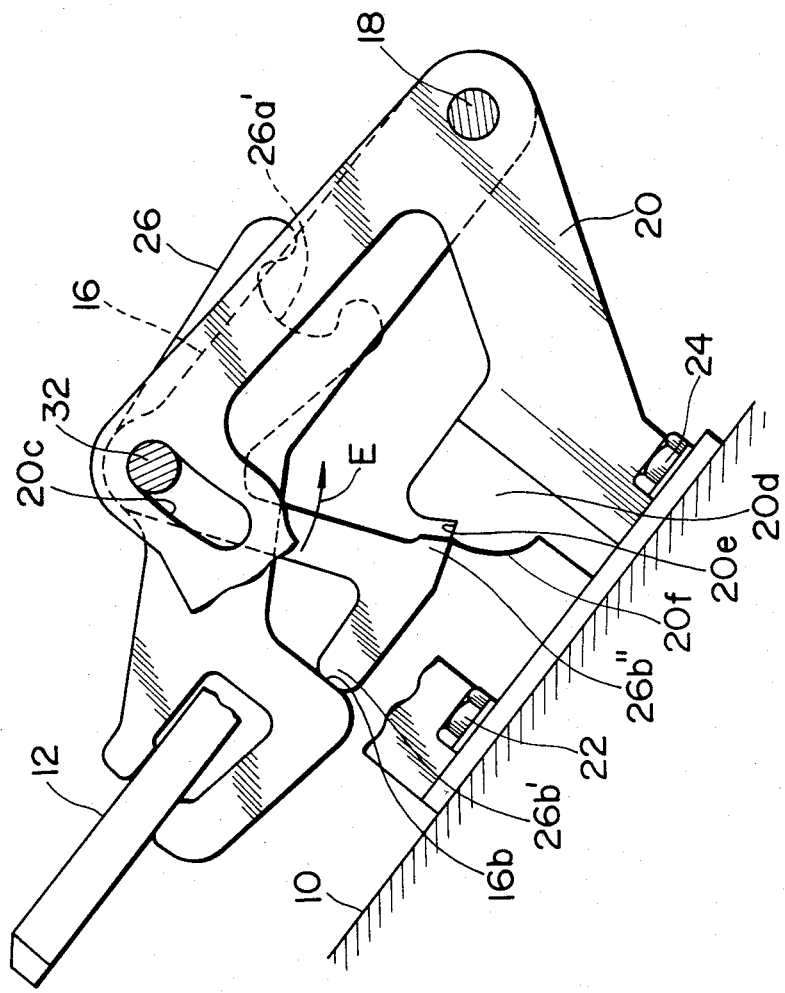

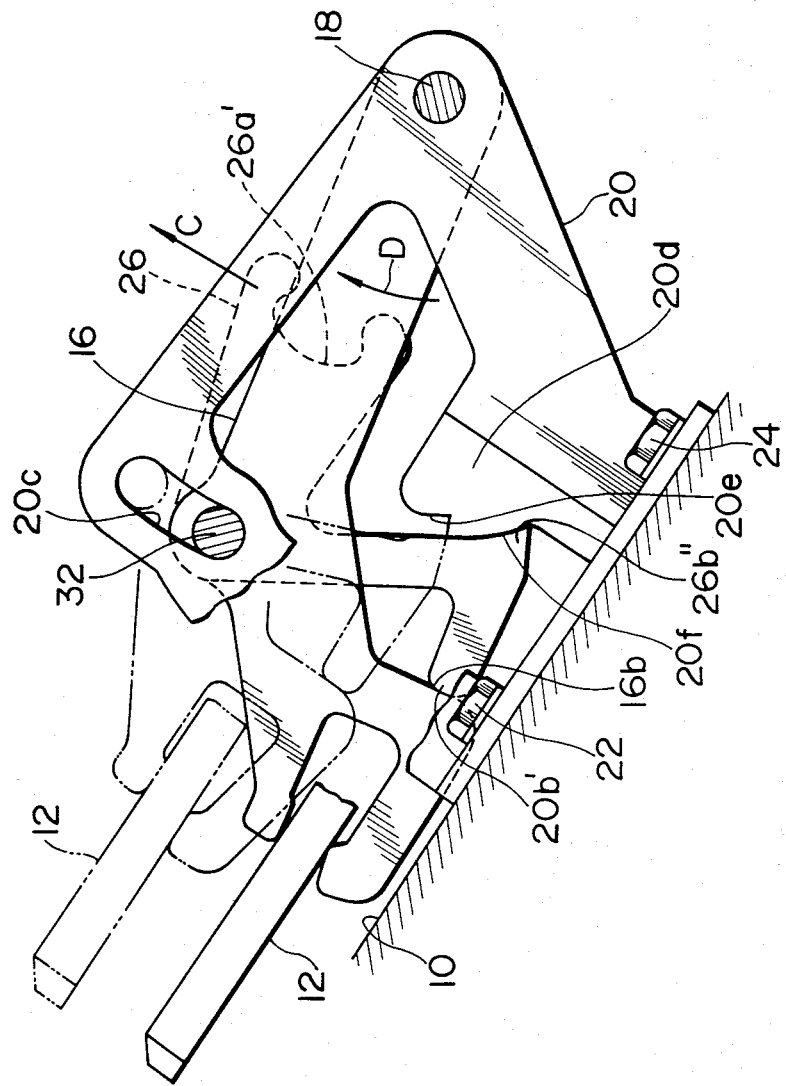

GEAR OPERATING MECHANISM OF AN AUTOMOTIVE MANUAL TRANSMISSION

BACKGROUND OF THE INVENTION

1. Field of the Invention

The present invention relates in general to an automotive selected gear sliding type manual transmission, and more particularly to a gear operating mechanism of the transmission, which has means for positively preventing the undesirable gear disengagement phenomenon.

2. Description of the Prior Art

In a manual transmission of a selected gear sliding type, a so-called "gear disengagement" sometimes happens particularly in a long-used transmission. The gear disengagement is an undesirable phenomenon in which the gear assuming its operating or engaged position suddenly and unexpectedly disengages from the associated gears interrupting the power transmitting connection between the engine and the engine driven road wheels. In order to solve such phenomenon, various measures have been hitherto proposed. However, some of them have been made without satisfying the handling comfortableness and production cost of the transmission.

SUMMARY OF THE INVENTION

Therefore, it is an essential object of the present invention to provide an improved gear operating mechanism which is constructed to positively prevent the undesired gear disengagement, satisfying the handling comfortableness and the production cost of the transmission.

According to the present invention, there is provided, in a selected gear sliding type manual transmission having a gear which is axially movable from its neutral position where it disengages from the associated gears to its operating position where it engages with the associated gears, a gear operating mechanism. The gear operating mechanism comprises a supporting bracket secured to a case of the transmission; a first lever pivotally connected to the supporting bracket to move the gear between the neutral position and the operating position in response to the movement of a speed change shift lever of the transmission; and a latch mechanism having first and second conditions, the first condition being a condition wherein the first lever is locked in a position to cause the gear to assume the operating position, and the second condition being a condition wherein the first lever assumes another position to cause the gear to assume the neutral position, wherein the latch mechanism is so arranged and constructed that when, with the gear assuming the operating position, a force (F) is applied to the gear to urge the same in a direction from the operating position to the neutral position, at least a part of the force is received by the transmission case through the latch mechanism.

BRIEF DESCRIPTION OF THE DRAWINGS

Other objects and advantages of the present invention will become clear from the following description when taken in conjunction with the accompanying drawings, in which:

FIGS. 3 and 4 are views similar to FIG. 2, but showing different operating conditions of the mechanism.

DETAILED DESCRIPTION OF THE INVENTION

In order to facilitate the explanation of the invention, the following description will be made with respect to a reverse gear operating mechanism. However, the present invention is not limited to such reverse gear operating mechanism, but applicable widely to any mechanisms so long as they include an axially slidable gear for effecting a predetermined gear ratio.

Figure 1:
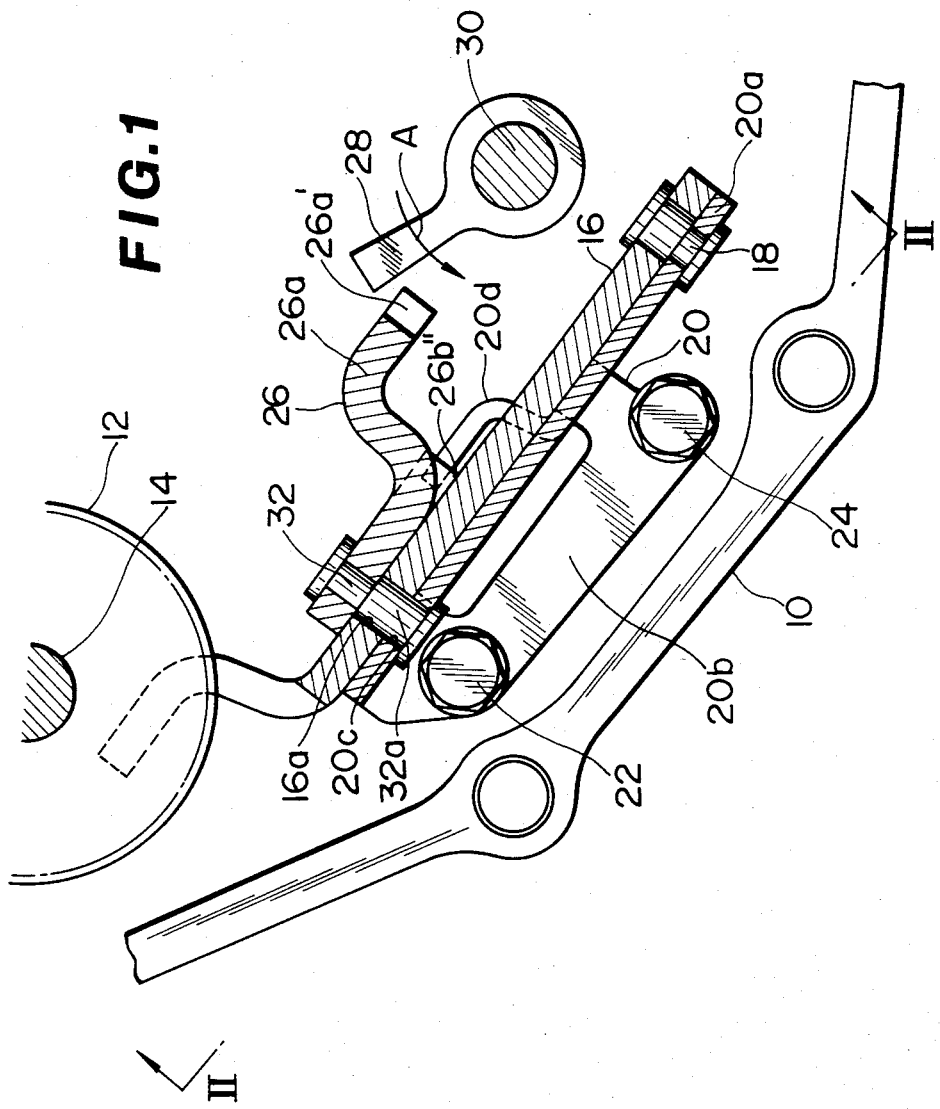
FIG. 1 is a laterally sectioned view of an automotive manual transmission of a selected gear sliding type, which is equipped with a reverse gear operating mechanism embodying the present invention, the view being taken on the line I—I of FIG. 2.
Figure 2:
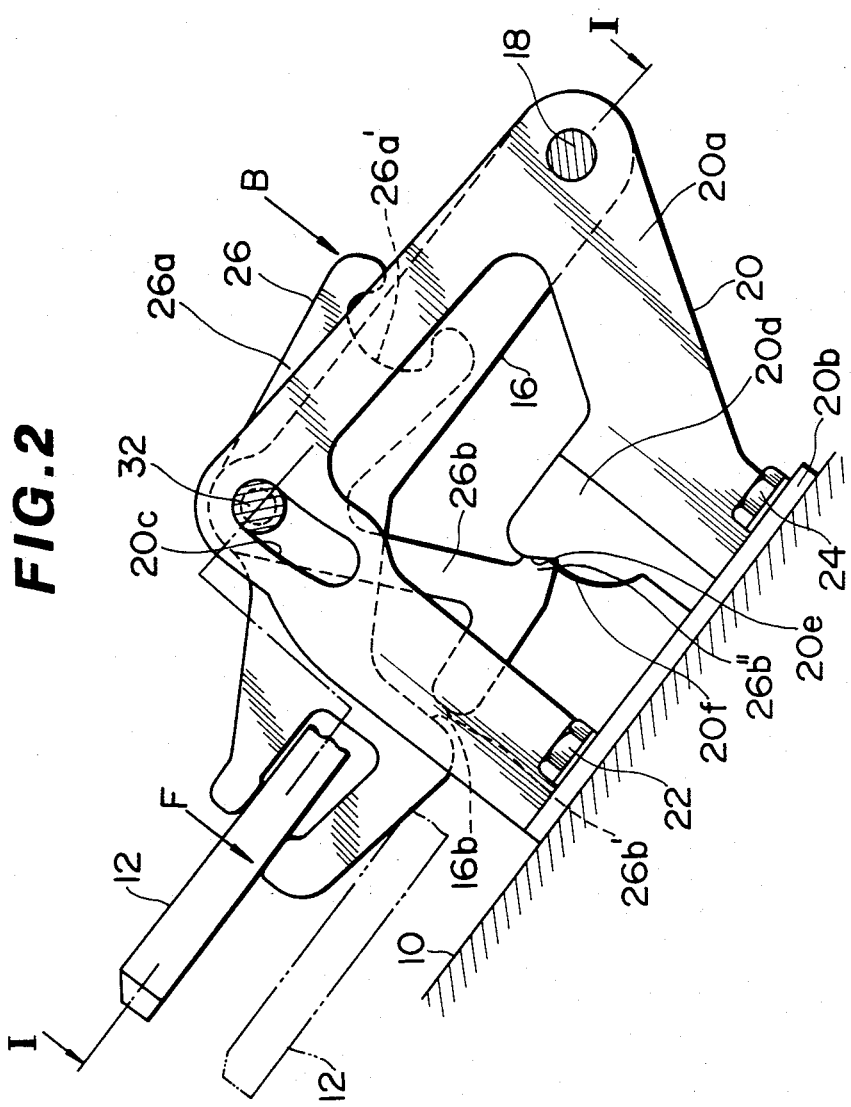
FIG. 2 is a view taken on the line II—II of FIG. 1, with some parts being not shown for clarification of the drawings.

Referring to FIGS. 1 and 2, especially FIG. 1, there is shown a part of an automotive manual transmission, where a reverse gear operating mechanism according to the present invention is arranged. Within a case 10 of the transmission, there is arranged a reverse idler gear 12 which is rotatably and axially slidably disposed on a stationary shaft 14. Although not shown in the drawing, conventional reverse input and output gears are securely mounted on input and output shafts respectively. The idler gear 12 is movable from an operating position where it meshes with both the reverse input and output gears to an inoperative or neutral position where it disengages from them. Thus, under the operating condition of the idler gear 12, the reverse input and output gears rotate together to effect the reverse condition of the transmission.

In accordance with the present invention, there is provided an operating or first lever 16 in order to axially move the idler gear 12 on and along the shaft 14. One end of the operating lever 16 is pivotally connected through a pivoting pin 18 to a support portion 20a of a bracket 20 which is secured at its base portion 20b to the transmission case 10 by bolts 22 and 24, so that the operating lever 16 is pivotable about the pin 18 to move over an imaginary flat plane which is parallel with the axis of the idler gear shaft 14. As is seen from FIG. 2, the other end of the operating lever 16 is forked into two arm portions which straddle the idler gear 12 to hold the same.

In accordance with the present invention, there is further provided a handling or second lever 26 which lies near the operating lever 16. As is understood from the drawings, the handling lever 26 is of a bellcrank type and comprises first and second arm portions 26a and 26b which extend radially outwardly from their united portion at a certain angle to each other. As is seen from FIG. 2, the leading end of the first arm portion 26a is bifurcated to define a smoothly curved recess 26a', while, the leading end of the second arm portion 26b is shaped like a hammer head with a front end 26b' and a back end 26b''. The back end 26b'' forms a pawl construction.

In the vicinity of the bifurcated end of the handling lever 26, there is arranged a pivoting lever 28 (see FIG. 1) which is rotatably and axially slidably disposed at its hub section on a stationary rod 30. The rod 30 extends in parallel with the idler gear shaft 14 and is secured to the transmission case 10. Although not shown in the drawings, the pivoting lever 28 is connected through a known link mechanism to a speed change shift lever which is handled by a driver in a vehicle cabin. The pivoting lever 28 is so arranged that when a select operation is effected by moving the shift lever (not shown) to a temporary position ready for effecting the reverse condition of the transmission, the pivoting lever 28 rotates in the direction of the arrow A thereby to engage with the recess 26a' of the handling lever 26, and when, then, a shift operation is effected by moving the shift lever (not shown) to the reverse position, the pivoting lever 28 moves axially along the shaft 30 in a certain direction thereby to move or rotate the handling lever 26 in the corresponding direction.

The base portion (the united portion of the first and second arm portions 26a and 26b) of the pivoting lever 26 is pivotally connected through a pivoting pin 32 to the generally middle portion of the operating lever 16. As is best seen from FIG. 1, the pivoting pin 32 has an enlarged section 32a which passes through both an opening 16a formed in the operating lever 16 and an elongate opening 20c formed in the support portion 20a of the bracket 20. The pin 32 is rivetted over to form heads thereof to join the bracket 20, the operating lever 16 and the handling lever 26 together. As is seen from FIG. 2, the opening 20c of the bracket 20 is an elongate curved slot of which outer and inner sides constitute arcs of respective circles whose centers lie on the axis of the pivoting pin 18. With this construction, it will be appreciated that the pivoting movement of the operating lever 16 together with the handling lever 26 within a predetermined angular range about the pivoting pin 18 is permitted without being obstructed by the bracket 20. As is seen from FIGS. 1 and 2, the bracket 20 is formed with a raised portion 20d of which leading end has a locking recess 20e. The pawl construction 26b" of the handling lever second arm portion 26b is lockingly engageable with the recess 20e when assuming a certain position. As is seen in FIG. 2, the operating lever 16 is formed, at the back side of the forked end thereof, with an engaging surface 16b with which the hammer head front end 26b' of the handling lever 26 is contactable. It is to be noted that when the mechanism is in a condition as shown by FIG. 2, the engaging surface 16b is separated from the hammer head front end 26b' by a distance corresponding to the substantial engaging depth of the recess 20e with respect to the pawl construction 26b". The support portion 20a of the bracket 20 is formed with a smoothly curved surface 20f which extends from the mouth of the recess 20e toward the base portion 20b of the bracket 20. The curved surface 20f constitutes an arc of a circle of which center lies on the axis of the pivoting pin 18.

In the following, operation will be described with reference to the drawings. For ease with which the description is made, it will be commenced with respect to the operating or engaged condition of the idler gear 12 wherein the idler gear 12 engages with both the reverse input and output gears (not shown). FIG. 2 shows such operating condition of the idler gear 12. Under this condition, the pivoting pin 32 assumes its uppermost position relative to the elongate curved slot 20c, and the pawl construction 26b" of the handling lever 26 is engaged with the recess 20e of the bracket 20 to be locked. The operating manner of the mechanism to achieve this condition will become apparent as the description proceeds.

When, at this condition, the driver moves the speed change shift lever (not shown) from the reverse position to the temporary position ready for the neutral condition, the pivoting lever 28 which, at this time, engages with the handling lever 26 is moved axially along the rod 30 in a certain direction, that is, for example, in the direction of the arrow B in FIG. 2. With this movement of the pivoting lever 28, the handling lever 26 is rotated about the pivoting pin 32 in the clockwise direction in FIG. 2 thereby disengaging the pawl construction 26b" thereof from the locking recess 20e of the bracket 20, and at the same time, contacting the hammer head front end 26b' with the engaging surface 16b of the operating lever 16. Thus, the operating lever 16 is then permitted to rotate about the pivoting pin 18 in the counterclockwise direction in FIG. 2 together with the handling lever 26, allowing the pivoting pin 32 to move in the elongate curved slot 20c toward the lower end of the same. It is to be noted that the engagement between the hammer head front end 26b' and the engaging surface 16b of the operating lever 16 provides the simultaneous counterclockwise movements of the operating lever 16 and the handling lever 26. With this operation, the operating lever 16 moves from the position of FIG. 3 (the position indicated by a phantom line in FIG. 4) to the position indicated by a solid line in FIG. 4 thereby moving the idler gear 12 from its operating position to its inoperative or neutral position. The parts are so arranged that when the pivoting pin 32 comes to the lowermost end of the elongate curved slot 20c, the idler gear 12 assumes its neutral position exactly.

When, then, the driver moves the speed change shift lever (not shown) from the temporary position to the neutral position, the pivoting lever 28 is rotated about the rod 30 in a direction to disengage from the handling lever 26. With this operation, the pivoting lever 28 assumes the position as shown in FIG. 1.

When, now, the driver effects a select operation by moving the speed change shift lever (not shown) to the temporary position ready for the reverse condition of the transmission, the pivoting lever 28 rotates about the rod 30 in the direction of the arrow A to come into engagement with the recess 26a' of the handling lever 26. When the driver, then, effect a shift operation by moving the speed change shift lever (not shown) to the reverse position, the pivoting lever 28 moves axially along the rod 30 toward this side as viewed in FIG. 1, that is, for example, in the direction of the arrow C in FIG. 4. Because of contact of the pawl construction 26b" of the handling lever 26 with the smoothly curved surface 20f of the bracket 20, the movement of the pivoting lever 28 in the direction C does not induce rotation of the handling lever 26 about the pivoting pin 32, but induces rotation of the same about the pivoting pin 18 in the direction of the arrow D together with the operating lever 16, allowing the pawl construction 26b" to slide along the surface 20f toward the locking recess 20e. It is to be noted that the simultaneous clockwise movement of the handling and operating levers 26 and 16 is achieved by the pivoting pin 32 which connects these two levers 26 and 16 together. Thus, the handling and operating levers 26 and 16 come to the respective positions as shown in FIG. 3, where the pivoting pin 32 assumes its uppermost position with respect to the elongate curved slot 20c. With such movement of the operating lever 16, the reverse idler gear 12 moves from the neutral position (shown by a solid line in FIG. 4) to the operating position (shown by a phantom line in the same drawing). At the final stage, the handling lever 26 rotates slightly about the pivoting pin 32 in the direction of the arrow E in FIG. 3, putting the pawl construction 26b" into the locking recess 20e to establish the locking engagement therebetween. With this operation, the mechanism returns to the condition as shown by FIG. 2.

When, now, the reverse idler gear 12 (see FIG. 2) at its operating condition is applied with a force F in a direction to cause the undesired gear disengagement, the force F is received by the transmission case 10 through the operating lever 16, the pivoting shaft 32, the handling lever second arm portion 26b, the pawl construction 26b", the locking recess 20e of the bracket 20 and the support portion 20a of the bracket. Thus, the gear disengagement does not occur according to the gear operating mechanism of the invention.

What is claimed is:

1. In a selected gear sliding type manual transmission having a gear being axially movable from a neutral position where it disengages from the associated gears to an operating position where it engages with the associated gears by means of a speed change shift lever of the transmission, a gear operating mechanism comprising:
   a supporting bracket secured to a case of the transmission;
   a first lever pivotally connected to said supporting bracket to move said gear between said neutral and operating positions in response to movement of the speed change shift lever; and
   means connecting the first lever to the speed change shift lever and being movable between first and second conditions in response to movement of the shift lever to move the first lever between positions corresponding to neutral and operating positions of the gear, wherein said means includes a pivotal latch mechanism which in said first condition enables said first lever to be locked in a position to cause the gear to assume the operating position, and in said second condition enables said first lever to assume another position to cause the gear to assume the neutral position,
   said latch mechanism including a pawl being engageable with the supporting bracket and arranged to prevent disengagement of the gear from the operating position to neutral position.

2. A gear operating mechanism as claimed in claim 1, in which said means connecting the first lever to the shift lever comprises:
   a second lever pivotally connected to said first lever;
   a first engaging portion formed on said second lever, said first engaging portion having a latch portion being lockingly engaged with a stationary portion of the supporting bracket to lock the first lever when said first lever assumes a position to cause the gear to assume the operating position; and
   a second engaging portion formed on said second lever, said second engaging portion being engaged with a portion of the first lever when said first lever assumes a position to cause the gear to assume the neutral position.

3. A gear operating mechanism as claimed in claim 1, wherein said second lever is of a bellcrank type and has first and second arm portions extending radially outward from their united portion at a certain angle to each other, said united portion being pivotally connected to said first lever through a pivoting pin.

4. A gear operating mechanism as claimed in claim 3, wherein said second arm portion has a hammerhead shaped construction with said first and second engaging portions extending in opposite directions to each other from the second arm portion to define the hammer-head construction therewith.

5. A gear operating mechanism as claimed in claim 4, wherein said first engaging portion is formed with a pawl, said stationary portion of the supporting bracket having a recess shaped to engage the pawl in locking contact.

6. A gear operating mechanism as claimed in claim 5, wherein said second engaging portion is a front end of the hammer-head construction of the second lever, and in which said portion of the first lever engageable with the second engaging portion is a back side surface of a forked end of said first lever by which said gear is held.

7. A gear operating mechanism as claimed in claim 6, further comprising stopper means which limits the pivoting movement of said first lever within a predetermined angular range.

8. A gear operating mechanism as claimed in claim 7, wherein said stopper means includes an elongate curved slot formed in said supporting bracket, said slot extending along an arcuate path having a center that lies on an axis about which said first lever is pivotally movable, said pivoting pin by which said first and second levers are pivotally connected being slidably received in said slot.

9. In a selected gear sliding type manual transmission having a gear axially movable from a neutral position to an operating position,
   a gear operating mechanism comprising:
   a supporting bracket secured to a case of the transmission;
   a first lever pivotally connected to said supporting bracket to move said gear between said neutral position and said operating position in response to movement of a speed change shift lever of the transmission;
   a second lever pivotally connected to said first lever; said second lever including a first engaging portion being lockably engageable with a stationary portion of the supporting bracket to lock said first lever when said first lever assumes a position causing the gear to assume the operating position to prevent gear disengagement; and a second engaging portion engageable with a portion of the first lever when said first lever assumes a position causing the gear to assume a neutral position.

10. In a selected gear sliding type manual transmission having a gear being axially movable from a neutral position where it disengages from associated gears to an operating position where it engages with the associating gears to an operating position where it engages with the associating gears by means of a speed change shift lever of the transmission, a gear operating mechanism comprising:
   a support bracket secured to a case of the transmission;
   a first lever pivotally connected to said supporting bracket to move said gear between said neutral and operating positions in response to movement of the speed change shift lever; and
   a non-resilient latch mechanism connected to the first lever and pivotal between first and second conditions in response to movement of the shift lever, wherein in said first condition of the latch mechanism, said first lever is locked in a position to cause the gear to assume the operating position, and in said second condition of the latch mechanism, said lever assumes another position to cause the gear to assume the neutral position, said latch mechanism including a pawl being engageable with the supporting bracket and being arranged to prevent disengagement of the gear from the operating position to neutral position.

11. The gear operating mechanism according to claim 9, wherein said first and second portions have a generally common longitudinal axis and extend to substantially entirely occupy a space formed between the first lever and the supporting bracket when the gear is in an operating position such that undesirable pivoting movement of the first lever causing gear disengagement from the operating position is prevented by contact between the first lever and the second engaging portion transmitting an undesirable gear disengaging force to the first engaging portion and thereby to the supporting bracket.

* * * * *